(12) United States Patent
Shen et al.

(10) Patent No.: US 10,268,517 B2
(45) Date of Patent: Apr. 23, 2019

(54) PARALLEL INPUT/OUTPUT VIA MULTIPATH SOFTWARE

(71) Applicant: International Business Machines Corporation, Armonk, NY (US)

(72) Inventors: Lan Ying Shen, Shanghai (CN); Xiao Yu Wang, Shanghai (CN); Li Li Yang, Shanghai (CN); Chen Zhang, Shanghai (CN); Da Lei Zhang, Shanghai (CN); Yu Zhou, Shanghai (CN); Jie Zou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 15/477,174

(22) Filed: Apr. 3, 2017

(65) Prior Publication Data

US 2018/0285159 A1  Oct. 4, 2018

(51) Int. Cl.
| | |
|---|---|
| G06F 9/46 | (2006.01) |
| G06F 9/50 | (2006.01) |
| G06F 9/48 | (2006.01) |
| G06F 9/52 | (2006.01) |
| G06F 9/38 | (2018.01) |
| G06F 12/126 | (2016.01) |

(52) U.S. Cl.
CPC .......... *G06F 9/5016* (2013.01); *G06F 9/3836* (2013.01); *G06F 9/4881* (2013.01); *G06F 9/505* (2013.01); *G06F 9/5038* (2013.01); *G06F 9/52* (2013.01); *G06F 12/126* (2013.01)

(58) Field of Classification Search
CPC .... G06F 3/0613; G06F 3/0635; G06F 3/0656; G06F 3/0659; G06F 3/067; G06F 9/3836; G06F 9/4881; G06F 9/5016; G06F 9/5038; G06F 9/505; G06F 9/52; G06F 12/126

USPC ............... 710/38, 39, 74; 711/150, 153, 168
See application file for complete search history.

(56) References Cited

U.S. PATENT DOCUMENTS

| | | |
|---|---|---|
| 7,865,588 B2 | 1/2011 | Hayden et al. |
| 8,769,162 B2 | 7/2014 | Baker et al. |
| | (Continued) | |

FOREIGN PATENT DOCUMENTS

WO  02084471 A1  10/2002

OTHER PUBLICATIONS

Agarwala et al, "Cluster Aware Storage Resource Provisioning in a Data Center", 2010 IEEE/FIP Network Operations and Management Symposium—NOMS 2010: Application Track, © 2010 IEEE, 14 pages.

*Primary Examiner* — Gary J Portka
(74) *Attorney, Agent, or Firm* — Edward J. Wixted, III

(57) ABSTRACT

A batch of input/output (I/O) requests, directed to multiple physical domains of storage area network disk (SAN disk), are prioritized for processing based on the workload (pressure) of the target physical domains, and further based on the workload of multiple input/output (I/O) paths available for transmission of the I/O data to or from the physical domains. Requests directed to a physical domain with low pressure (relative to other physical domains to which some of the I/O requests are directed) are queued up and sent to the physical domain on an I/O path having a low workload (relative to other available I/O paths). Requests directed to a physical domain under relatively high pressure are queued up and sent to the physical domain on an I/O path having a relatively higher workload.

18 Claims, 10 Drawing Sheets

(56) References Cited

U.S. PATENT DOCUMENTS

| | | | |
|---|---|---|---|
| 2007/0248017 A1* | 10/2007 | Hinata | G06F 3/061 |
| | | | 370/238 |
| 2008/0288671 A1 | 11/2008 | Masuda | |
| 2015/0248254 A1 | 9/2015 | Matsunaga et al. | |
| 2015/0269099 A1* | 9/2015 | Kawano | G06F 13/18 |
| | | | 710/316 |
| 2016/0019005 A1* | 1/2016 | Mori | G06F 11/1076 |
| | | | 711/114 |
| 2016/0335003 A1 | 11/2016 | Ahmed et al. | |

* cited by examiner

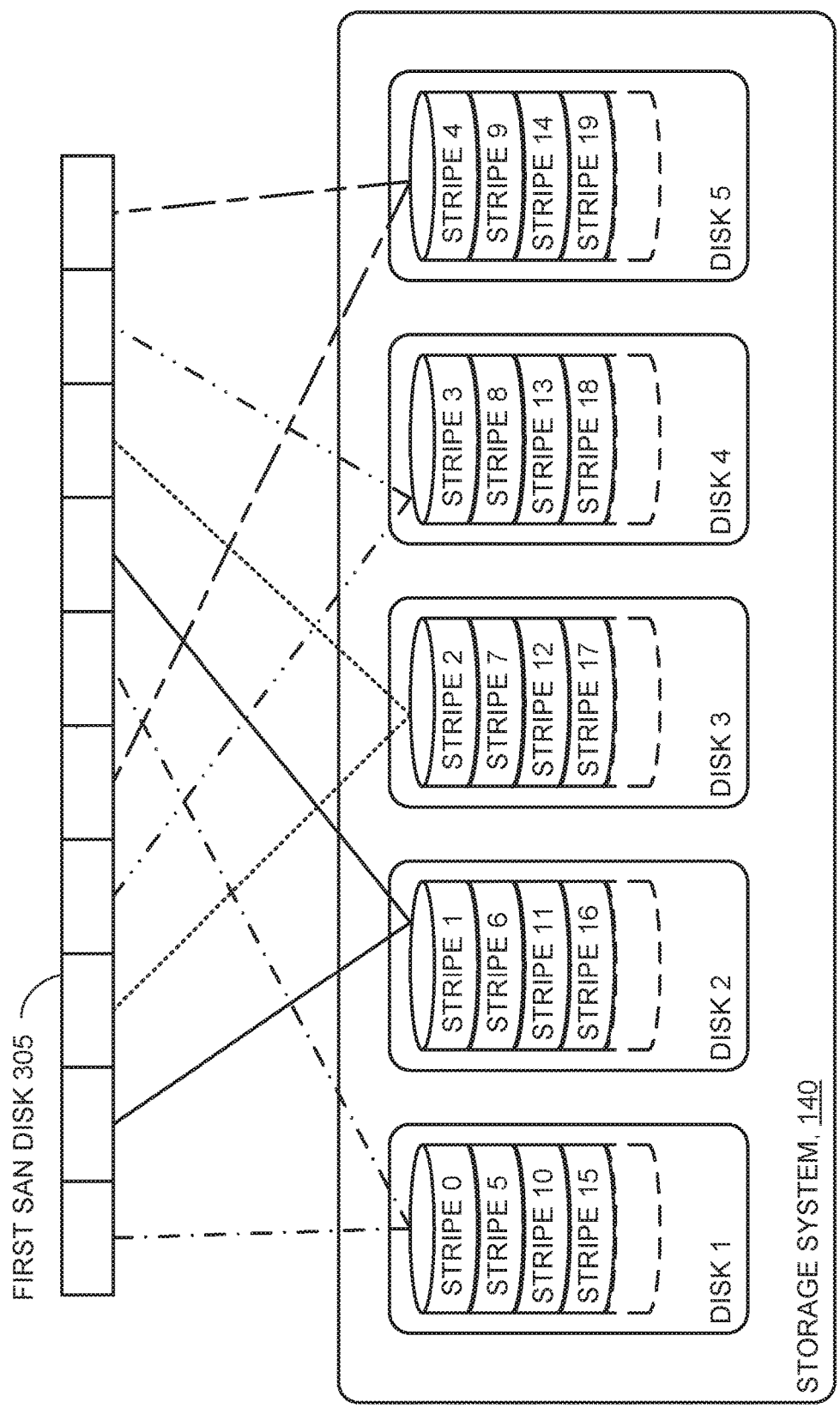

FIRST SAN DISK 305-1

| 0000 | 0011 | 0031 | 0081 | 0091 | 0301 | 0591 | 0701 | 0751 | 1001 | 1201 |
|------|------|------|------|------|------|------|------|------|------|------|
| A | B | C | A | D | C | B | E | D | E | E |
| 0010 | 0030 | 0080 | 0090 | 0300 | 0590 | 0700 | 0750 | 1000 | 1200 | 3000 |

PHYSICAL DOMAIN TABLE, 306

| PHYSICAL DOMAIN IDENTIFIER | ADDRESS RANGE | |
|---|---|---|
| A | 0000 | 0010 |
|   | 0081 | 0090 |
| B | 0011 | 0030 |
|   | 0591 | 0700 |
| C | 0031 | 0080 |
|   | 0301 | 0590 |
| D | 0091 | 0300 |
|   | 0701 | 1000 |
| E | 0701 | 0750 |
|   | 1001 | 1200 |
|   | 1201 | 3000 |

FIG. 3A

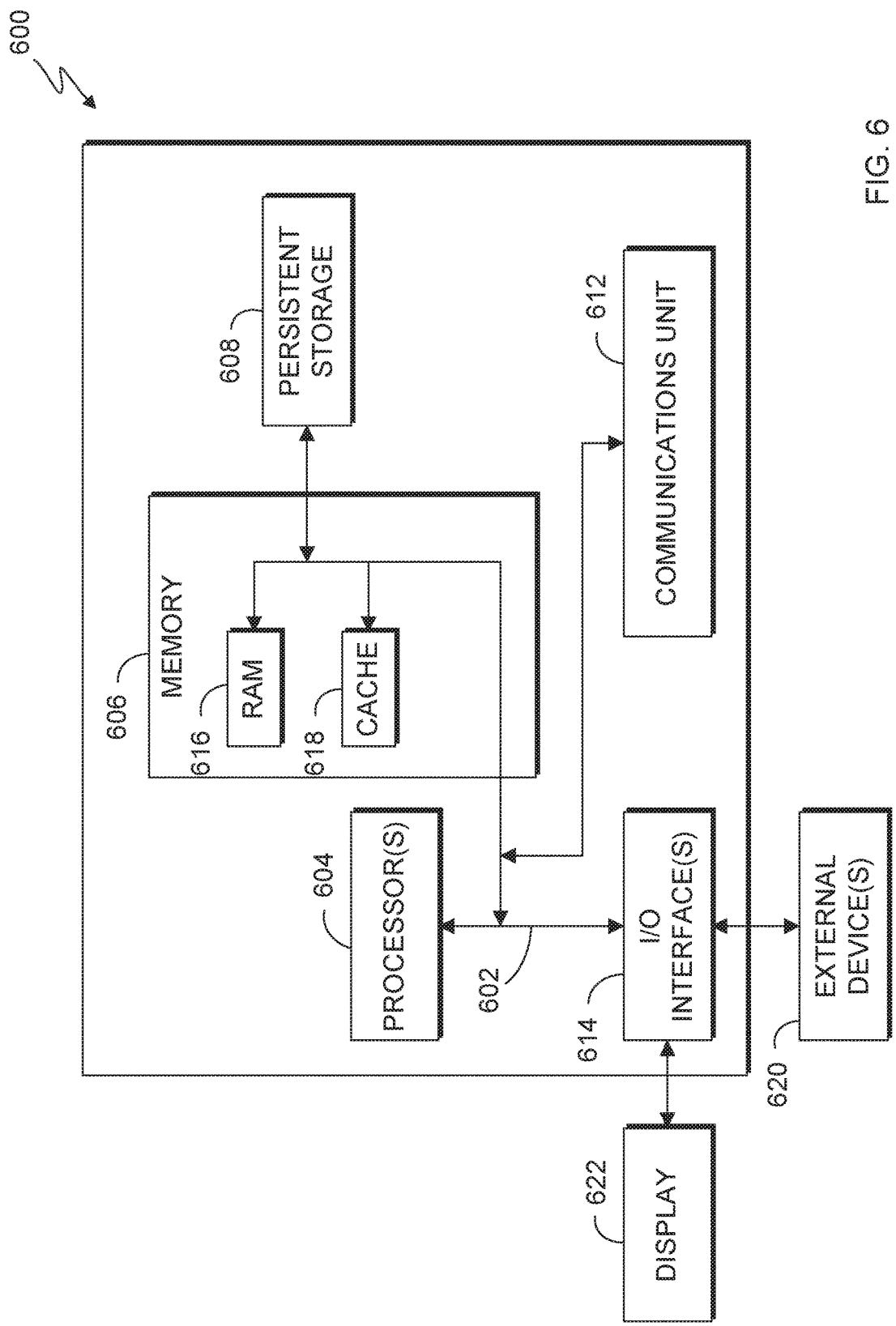

PARALLEL INPUT/OUTPUT VIA MULTIPATH SOFTWARE

BACKGROUND OF THE INVENTION

The present invention relates generally to the field of information technology storage systems, and more specifically to interaction with storage area networks through multipath communications.

In information technology (IT) systems with storage area network (SAN) storage, multipath software is sometimes used by a host system to send input/output (I/O) requests to the storage system. In multipath I/O, multiple data paths are provided between a host computer system and a storage system, through buses, controllers, switches, and bridges connecting them. Multipath software can send I/O requests to the storage system via one or more of the multiple I/O paths, to provide features including load balancing, and path management.

A volume in SAN storage (SAN disk) is made up of multiple physical areas, herein referred to as physical domains. Different physical domains handle I/O requests independently, and without impact to other physical domains. The physical domains may have differing I/O workloads that shift over time (sometimes herein referred to as pressures).

SUMMARY

According to an aspect of the present invention, there is a method, computer program product and/or system that performs the following operations (not necessarily in the following order): (i) receiving a physical domains information dataset (PDI dataset) where the PDI dataset includes real-time workload information pertaining to a plurality of physical domains of a storage system; (ii) selecting a selected physical domain from the plurality of physical domains, based at least in part on information in the PDI dataset; (iii) reading an input/output (I/O) request queue corresponding to the selected physical domain; (iv) selecting a selected I/O request from the I/O request queue; (v) receiving a path workload information dataset (PWI dataset) where the PWI dataset includes real-time workload information with respect to a plurality of I/O paths corresponding to the selected physical domain; (vi) selecting a selected I/O path from the plurality of I/O paths, based at least in part on information in the PWI dataset; and (vii) sending the selected I/O request to the selected physical domain, through the selected I/O path.

BRIEF DESCRIPTION OF THE DRAWINGS

FIG. 1B is a functional block diagram depicting further aspects of a computing environment in accordance with at least one embodiment of the present invention;

FIG. 3A is a storage fragment diagram and physical domain table in accordance with at least one embodiment of the present invention;

FIG. 6 is a block diagram depicting components of a computer, in accordance with at least one embodiment of the present invention.

DETAILED DESCRIPTION

Some embodiments of the present invention prioritize a batch of input/output (I/O) requests, directed to multiple physical domains of a storage area network disk (SAN disk), based on the workload (pressure) of the physical domains, and further based on the workload of multiple input/output (I/O) paths. Requests directed to a physical domain with low pressure (relative to other physical domains to which some of the I/O requests are directed) are queued up and sent to the physical domain on an I/O path having a low workload (relative to other available I/O paths). Requests directed to a physical domain under relatively high pressure are queued up and sent to the physical domain on an I/O path having a relatively higher workload.

The present invention will now be described in detail with reference to the Figures.

Figure 1A:
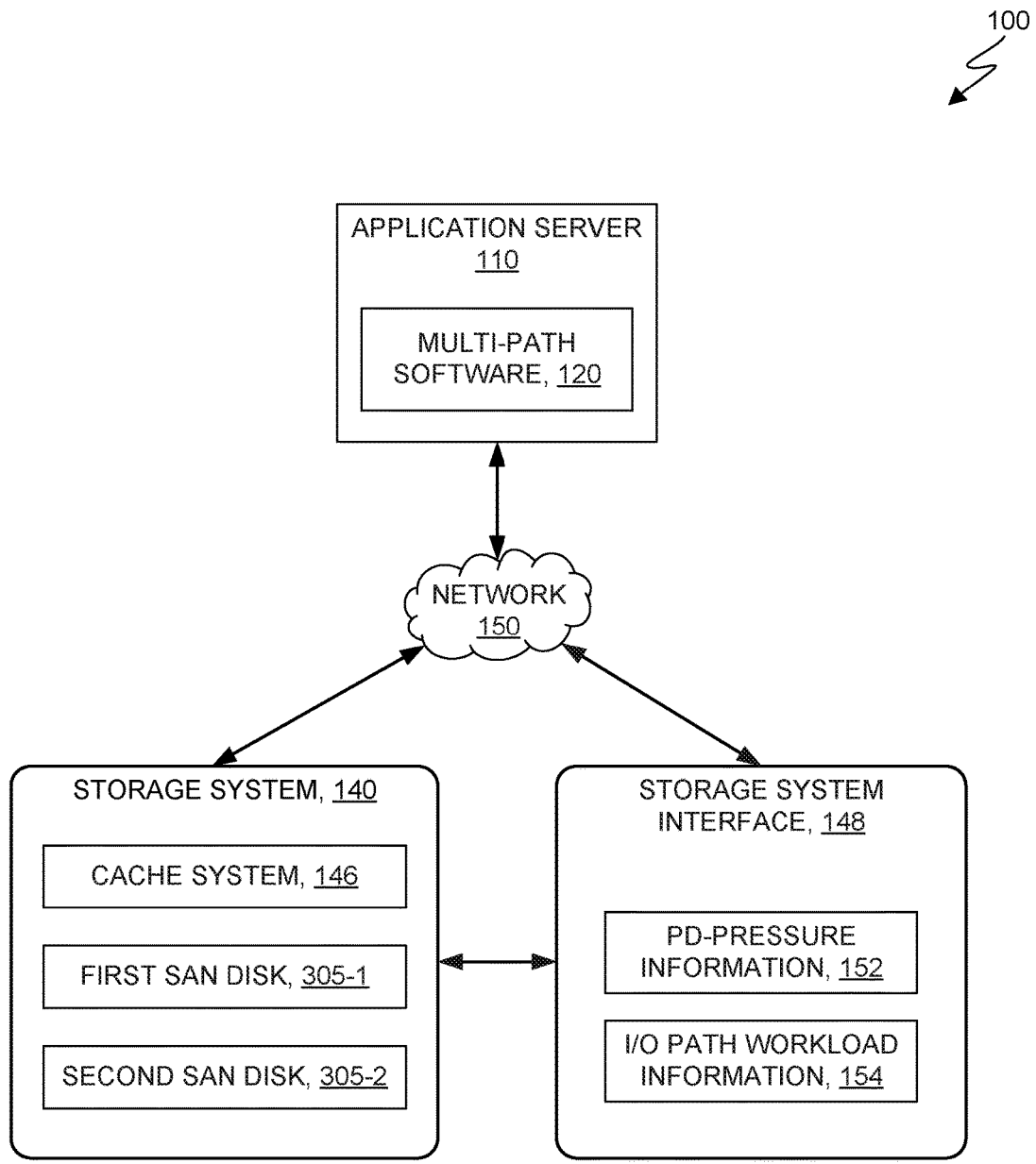
FIG. 1A is a functional block diagram depicting a computing environment in accordance with at least one embodiment of the present invention.
Figure 2A:
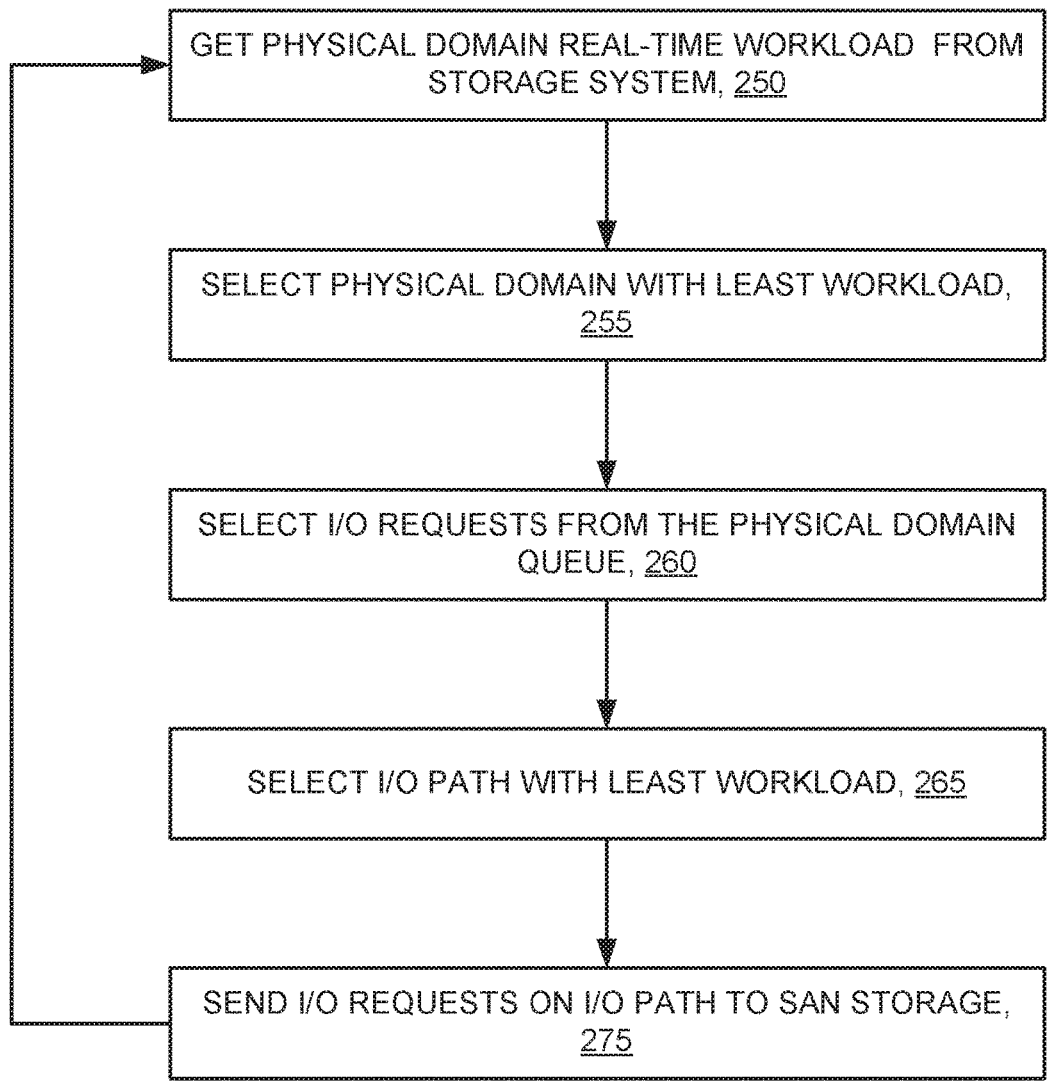
FIG. 2A is a flowchart depicting a storage input/output processing method in accordance with at least one embodiment of the present invention.
Figure 2B:
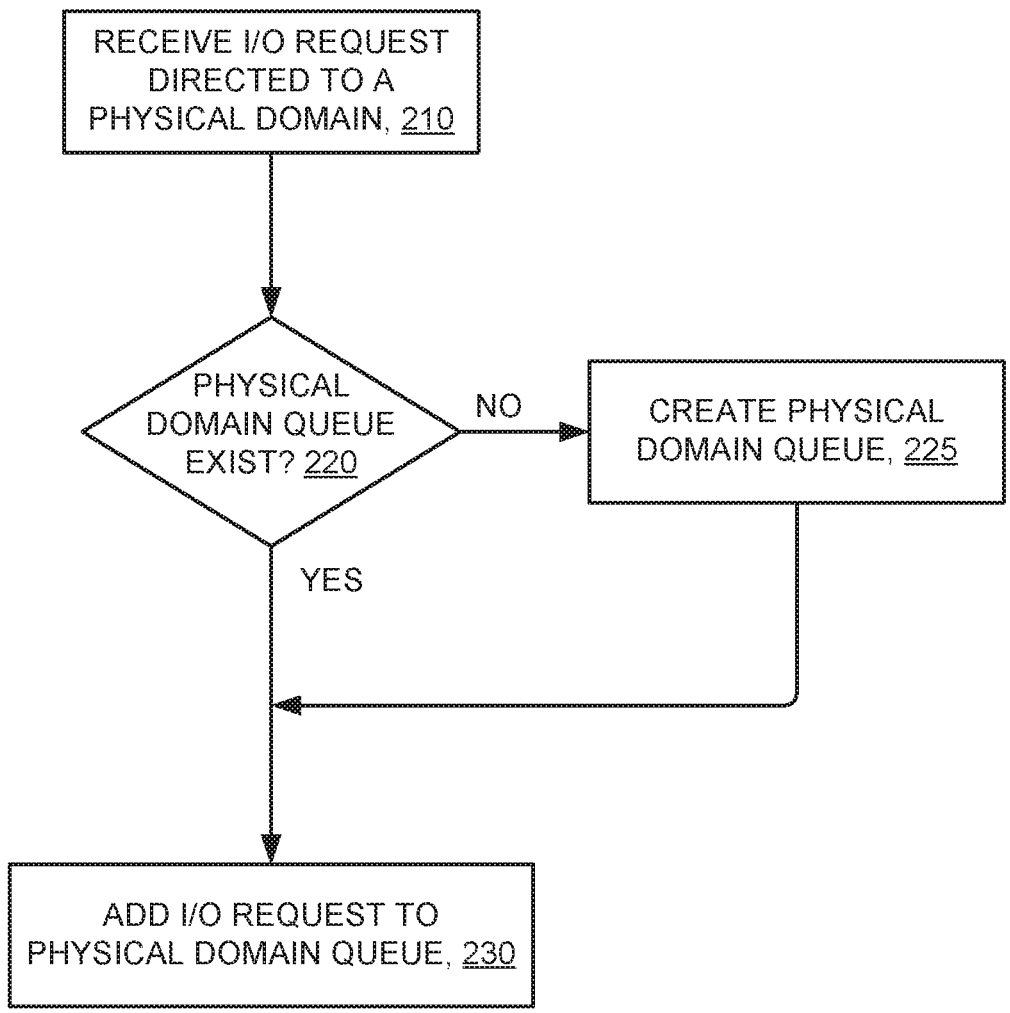
FIG. 2B is a flowchart depicting an input/output queuing method in accordance with at least one embodiment of the present invention.

FIG. 1A is a functional block diagram depicting a computing environment 100 in accordance with an embodiment of the present invention. Computing environment 100 includes: application server 110; multi-path software 120; storage system 140; cache system 146; storage system interface 148; network 150; physical disk pressure information 152; I/O path workload information 154; first SAN disk 305-1; and second SAN disk 305-2.

Application server 110 can be any of a desktop computer, a laptop computer, a specialized computer server, or any other computer system known in the art. In some embodiments, application server 110 represents a computer system utilizing clustered computers and components to act as a single pool of seamless resources when accessed through network 150. In general, application server 110 is representative of any electronic device, or combination of electronic devices, capable of executing machine-readable program instructions, as described in greater detail with regard to FIG. 6.

Referring to FIG. 1B, storage system 140 includes multiple striped physical disks, including first SAN disk 305. First SAN disk 305 includes physical disks 1, 2, 3, 4 and 5. Disk 1 includes stripes 0, 5, 10 and 15. Disk 2 includes stripes 1, 6, 11 and 16. Disk 3 includes stripes 2, 7, 12 and 17. Disk 4 includes stripes 3, 8, 13 and 18. Disk 5 includes stripes 4, 9, 14 and 19.

In some conventional systems, an application server uses multipath software to perform input/output (I/O) interactions with a SAN disk. I/O requests are assigned to each I/O path in accordance with a round-robin algorithm. A round-robin algorithm may ensure that the I/O load is balanced among the multiple I/O paths. For example, assume a batch of 12 I/O requests (R-01, R-02 . . . R-12) are to be serviced.

Assume further that there are four I/O paths available (Path-01, Path-02, Path-03 and Path-04). A round-robin algorithm may assign each I/O request to an I/O path as indicated in Table 1 below.

TABLE 1

Round-robin assignment of I/O requests to I/O paths

| I/O Request: | Assigned to I/O path: |
|---|---|
| R01, R05, R09 | Path-01 |
| R02, R06, R10 | Path-02 |
| R03, R07, R11 | Path-03 |
| Ro4, R08, R12 | Path-03 |

Some embodiments of the present invention may recognize one, or more, of the following facts, potential problems and/or potential areas for improvement with respect to the conventional round-robin assignment method discussed above. If, for example, R01, R02, R03 and R04 should happen to be directed to a given physical disk, then although there are four available I/O paths over which to perform the I/O, the performance of the given physical disk may become a storage performance bottleneck. Multipath software does not know the physical distribution of the SAN disk and therefore is not able to avoid such a bottleneck.

Some embodiments of the present invention may include one, or more, of the following features, characteristics and/or advantages: (i) distributes I/O requests based on the workloads of the physical disks and workloads of the I/O paths; (ii) avoids and/or minimizes physical disk I/O performance bottleneck; and/or (iii) performs workload balancing among the physical disks. Some embodiments may not have these potential advantages and these potential advantages are not necessarily required of all embodiments.

Some embodiments of the present invention make use of three concepts: (i) physical domain (PD); (ii) physical domain table (PD-table); and (iii) physical domain real-time workload, also herein sometimes referred to as physical domain pressure (PD-pressure). The following few paragraphs will elaborate on these concepts with reference to FIGS. 3A and 3B.

Physical Domain (PD): A physical domain includes one or more contiguous areas of a storage area network disk (SAN disk). If a PD includes more than one contiguous area, the areas may or may not be adjacent to each other. Each physical domain has an identifier (ID) that is unique in the SAN disk. I/O requests that are directed to different PDs have no significant impact on each other, but I/O requests that are directed to the same PD may impact each other's performance. A SAN disk may be divided into any number of physical domains. First SAN disk 305-1 of FIG. 3A illustrates a SAN disk divided into five physical domains, and the corresponding IDs are A, B, C, D, and E.

Physical Domain Table (PD-Table): Physical domain table 306 corresponds to first SAN disk 305-1. The PD-table is a data structure that describes the physical domain configuration of the corresponding SAN disk. The PD-table includes a physical domain identifier list, shown under the Physical Domain Identifier column heading. The addresses that correspond to the physical domains are given under the Address Range column heading. For example, physical domain A includes two areas within first SAN disk 305-1: (i) the address range 0000 to 0010; and (ii) the address range 0081 to 0090. Physical domain A is represented in SAN disk 305-1 as the boxes labelled with the identifier "A", and showing the same address ranges as given in table 306. The other physical domains of first SAN disk 305-1 are represented in the physical domain table.

Figure 3B:
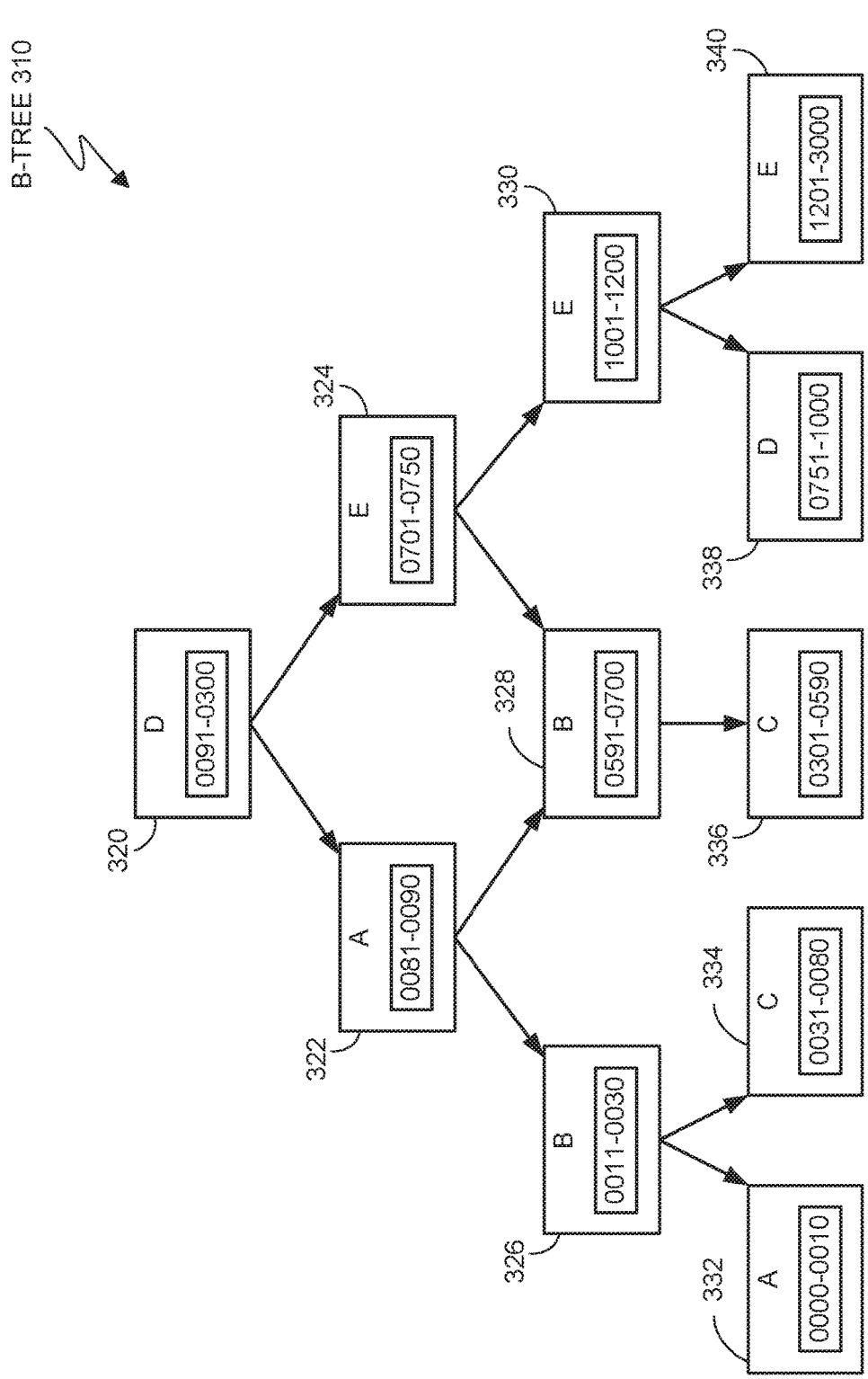
FIG. 3B is a graph depicting a B-tree data structure of a storage fragment in accordance with at least one embodiment of the present invention

In some embodiments of the present invention, the physical domain table comprises a B-tree data structure, for example B-tree 310 of FIG. 3B, where physical domain information of first SAN disk 305-1 is stored in the nodes of the B-tree. Alternatively, in some embodiments of the present invention, the physical domain information is stored in only the leaf nodes (nodes 332, 334, 336, 338 and 340) of the B-tree. For a given fragment of a SAN disk, the corresponding physical domain IDs can be searched out from the B-tree. A fragment of a SAN disk may contain more than one physical domain. Physical domain information includes the physical domain IDs and the corresponding address ranges.

The example embodiment of FIG. 3B shows a relationship between: (i) the physical domains on first SAN disk 305-1; and (ii) the nodes of B-tree 310. Nodes 322 and 332 collectively describe physical domain A of the first SAN disk. Node 322 includes the physical domain identifier (ID) "A", and the bounds of an address range (81-90) assigned to physical domain A. Node 332 also includes the ID "A", representing another section of physical domain A, and the bounds of the corresponding address space (0-10). Physical domain A is represented by the boxes labeled "A" of first SAN disk 305-1 that respectively correspond to nodes 332 (addresses 0-10) and 322 (addresses 81-90). Note: the bounds of an address ranges in a node of the B-tree are resolvable to physical addresses of the SAN disk. The lower bound and upper bound of an address range identify (or are resolvable to) a starting address of the range and an ending address of the range.

Similarly: (i) physical domain B of first SAN disk 305-1 is represented by nodes 326 and 328 which both include ID "B" and respectively map to address ranges 11-30 (node 326) and 591-700 (node 328); (ii) physical domain C is represented by nodes 334 and 336 which both include ID "C" and respectively map to address ranges 31-80 (node 334) and 301-590 (node 336); (iii) physical domain D is represented by nodes 320 and 338 which both include ID "D" and respectively map to address ranges 91-300 (node 320) and 751-1000 (node 338); and (iv) physical domain E is represented by nodes 324, 330, and 340, which all include ID "E" and respectively map to address ranges 701-750 (node 324), 1001-1200 (node 330), and 1201-3000 (node 340).

Arrows in B-tree 310 represent pointers in the data structure that link each parent node to its respective child node(s). In some embodiments of the present invention, leaf nodes (332, 334, 336, 338 and 340) of the B-tree do not have child nodes, but the data structure still includes space for the pointers, such that in case new nodes for example are added, or the physical domain structure is re-configured, the leaf nodes can be converted to parent nodes with corresponding child nodes. For the leaf nodes, the pointers may be populated with null or default values to indicate that no child nodes are present.

Physical Domain Real-Time Work Load (PD-Pressure): The PD-pressure of a physical domain is a measure of the work load of the physical domain over a given period of time. There are various ways to measure the PD-pressure.

Some ways the PD-pressure of a given physical domain may be measured include, without limitation: (i) measuring a duty cycle experienced by the physical domain (time that the domain is actively transferring data in and/or out as a proportion of the total time over which the duty cycle is measured); (ii) measuring an instantaneous and/or time-averaged workload backlog (for example, the number of I/O requests that are in queue waiting to be serviced); and/or (iii) tracking the data I/O volume transferred into or out of the physical domain over a given time period.

A SAN disk is produced by a SAN storage system. The storage system may divide the SAN disk into any number of physical domains. In some embodiments of the present invention, a physical domain is configured such that it resides on a given physical disk. For example, physical domains of a striped SAN disk can be divided as shown in FIG. 3A.

Some embodiments of the present invention perform the following actions: (i) a SAN storage system supplies storage system interface 148 (see FIG. 1A) through which the integrated physical domains table and the physical domain real-time work load (PD-pressure) of a SAN disk can be queried; (ii) when a host attaches to the SAN disk, the host invokes the interface to get the PD-table from the SAN storage system; (iii) when multipath software receives a batch of I/O requests, the multipath software searches the PD-table to determine to which physical domain each I/O request is directed; (iv) the multipath software puts all the I/O requests involving a given PD into an I/O queue dedicated to that PD (meaning each physical domain implicated in the batch of I/O requests has a corresponding I/O queue); (v) the multipath software queries the PD-pressure from storage system; (vi) the multipath software selects a physical domain with the least PD-pressure; (vii) the multipath software selects some or all of the I/O requests from the queue dedicated to the selected PD; (viii) the multipath software selects an I/O path currently having the least work load; (ix) the multipath software assigns the selected I/O requests to the selected I/O path; (x) the I/O path sends the I/O requests to the storage system; (xi) the storage system receives the I/O requests and updates the PD-pressure. The cycle of items (iii) through (xi) repeats until all I/O requests have been serviced.

Figure 4A:
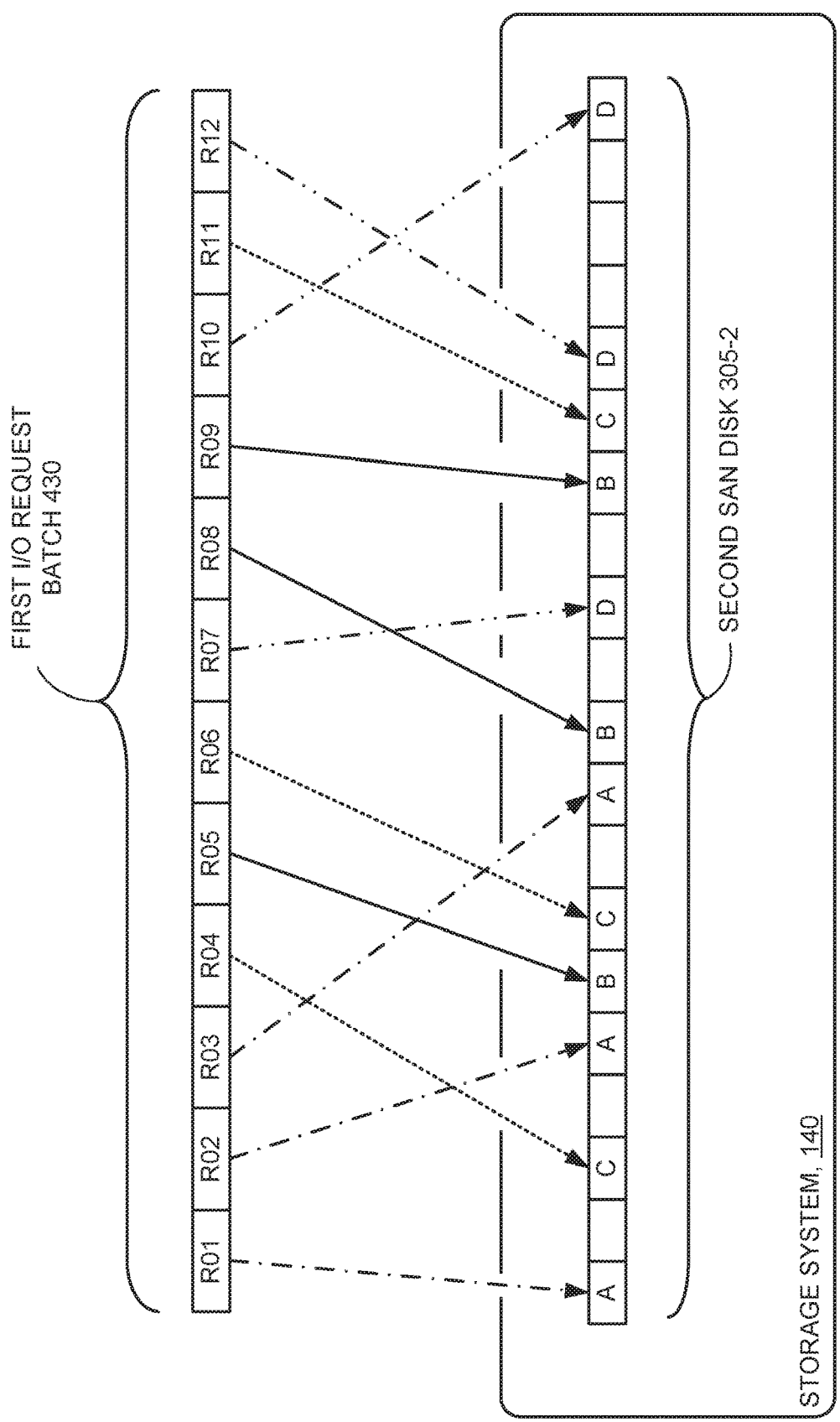
FIG. 4A is a block diagram depicting a batch of input/output requests directed to physical domains of a storage area network in accordance with at least one embodiment of the present invention.
Figure 4B:
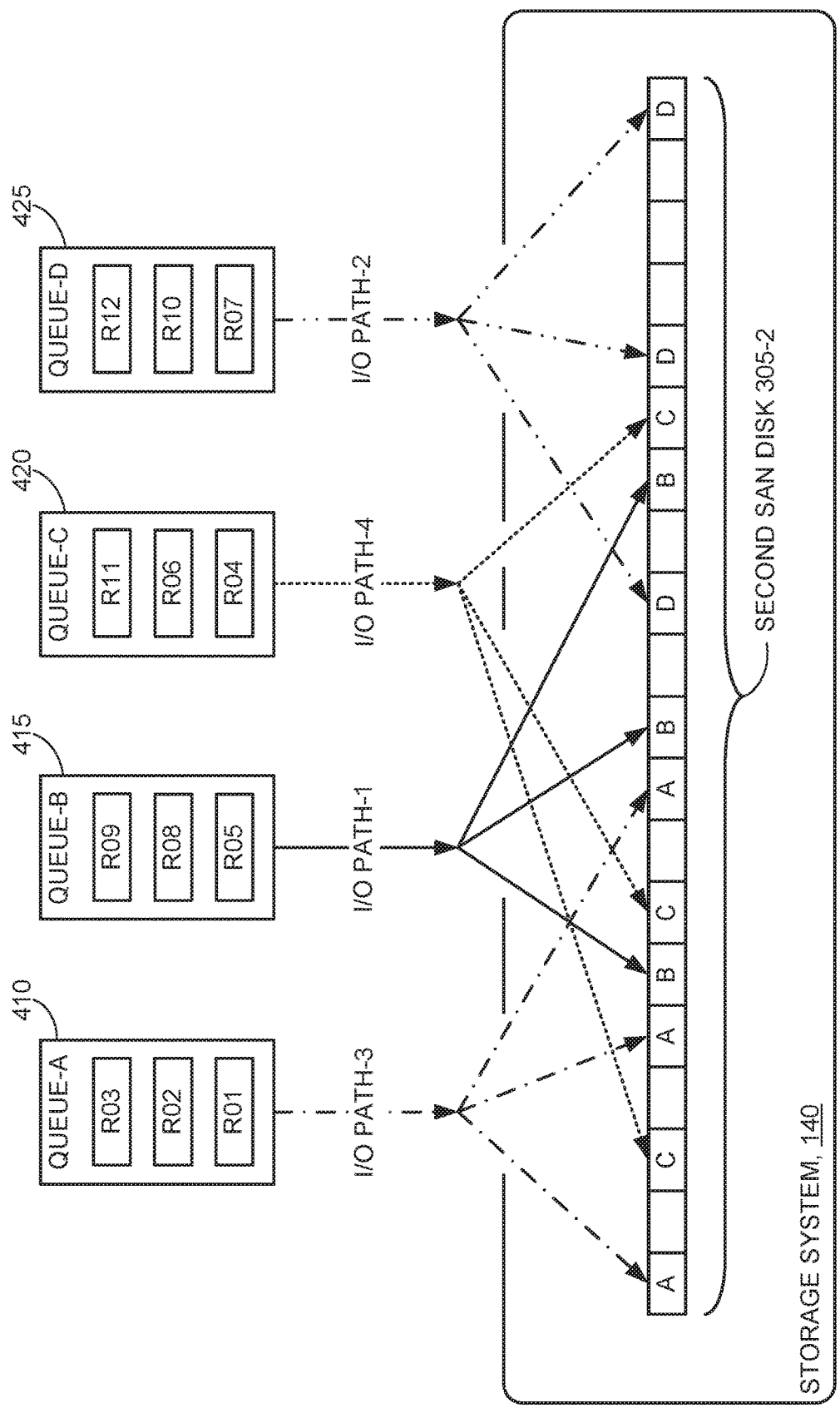
FIG. 4B is a block diagram depicting queued input/output requests directed along independent input/output paths to physical domains of a storage area network in accordance with at least one embodiment of the present invention.

An example illustrative embodiment will now be discussed with reference to FIGS. 4A and 4B. Application server 110 (see FIG. 1A) sends a batch of I/O requests to storage system 140, and more particularly, to second SAN disk 305-2 of storage system 140. The batch of I/O requests includes twelve requests: R01 through R12. Multipath software 120 (see FIG. 1A) invokes storage system interface 148 to search the PD-table (not shown in FIGS. 4A and 4B) and determines the following:

Requests R01, R02 and R03 are directed to physical domain A of second SAN disk 305-2;

Requests R05, R08 and R09 are directed to physical domain B of second SAN disk 305-2;

Requests R04, R06 and R11 are directed to physical domain C of second SAN disk 305-2; and Requests R07, R10 and R12 are directed to physical domain D of second SAN disk 305-2.

Multipath software 120 establishes an I/O queue (or uses an existing I/O queue) corresponding to each physical domain (in this example, physical domains A, B, C, and D) implicated in the batch of I/O requests. That means queue-A 410 is dedicated to I/O requests that are directed to physical domain A, queue-B 415 is dedicated to I/O requests that are directed to Physical domain B, and so on with regard to queue-C 420 and queue-D 425, respectively corresponding to physical domains C and D.

Multipath software 120 places each I/O request into the appropriate I/O request queue as outlined in the paragraph above. For example, queue-A 410 receives I/O requests R01, R02, and R03, as those requests are directed to physical domain A. Queue-B 415 receives I/O requests R05, R08, and R09. Queue-C receives I/O requests R04, R06 and R11. Finally queue-D 425 receives requests R07, R10 and R12.

Multipath software 120, by reference (through storage system interface 148) to PD-pressure information 152 and I/O path workload information 154 (see FIG. 1A), finds the following conditions: (i) I/O paths, sorted in order from least workload to heaviest workload, are I/O paths 1 (least workload), 2 (mid-low workload), 3 (mid-high workload) and 4 (highest workload); and (ii) physical domains, sorted in order from least pressure to heaviest pressure, are physical domains B (least pressure), D (mid-low pressure), A (mid-high pressure) and C (highest pressure). Referring to FIG. 4B, therefore, multipath software 120 prioritizes the I/O requests as follows:

PD-B having the least PD-pressure and I/O path-1 having the least workload therefore the requests in queue-B 415 (R05, R08 and R09) are sent to physical domain B via I/O path-1;

PD-D having mid-low PD-pressure and I/O path-2 having mid-low workload therefore the requests in queue-D 425 (R07, R10, and R12) are sent to physical domain D via I/O path-2;

PD-A having the mid-high PD-pressure and I/O path-3 having the mid-high workload therefore the requests in queue-A 410 (R01, R02, and R03) are sent to physical domain A via I/O path-3; and PD-C having the greatest PD-pressure and I/O path-4 having the greatest workload therefore the requests in queue-C 420 (R04, R06, and R11) are sent to physical domain C via I/O path-4.

Some embodiments of the present invention use a cache working in concert with the storage system. In the example embodiment of FIG. 5, storage system 140 includes: cache system 146; and physical domains PD-E, PD-F, PD-G and PD-H. Cache system 146 is partitioned into cache-E 502, cache-F 504, cache-G 506 and cache-H 508. These cache partitions interface with respectively corresponding physical domains PD-E, PD-F, PD-G, and PD-H.

When a batch of I/O requests arrives at a storage system, the storage system determines to which physical domain each I/O request of the batch is directed. The storage system writes (in each case where the I/O request is a write) the I/O data into the corresponding partition of the cache, or reads from the cache (in each case where the I/O request is a read).

Figure 5:
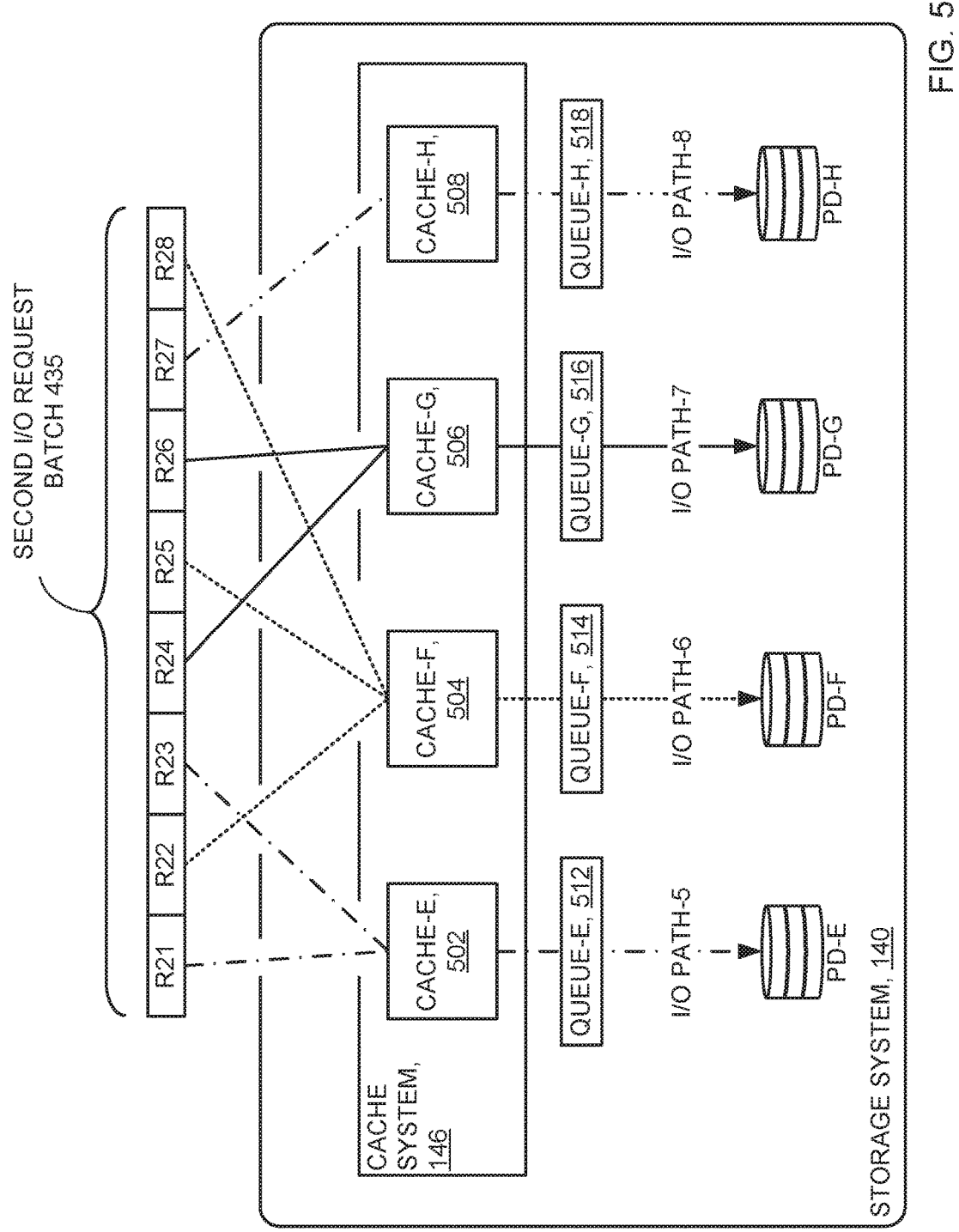
FIG. 5 is a storage system block diagram depicting processing of a batch of input/output requests.

In the embodiment of FIG. 5, assume second I/O request batch 435 arrives at storage system 140. The batch includes I/O requests R21 through R28. The storage system determines that R21 and R23 are directed to physical domain E, and therefore directs R21 and R23 to cache-E, 502. The storage system determines that R22, R25 and R28 are directed to physical domain F, and therefore directs R22, R25 and R28 to cache-F, 504. The storage system further determines that R24 and R26 are directed to physical domain G, and therefore directs R24 and R26 to cache-G, 506. The storage system also determines that R27 is directed to physical domain G, and therefore directs R27 to cache-H, 502.

When the cache flushes data down to the physical disks, I/O requests from each cache partition are added to an I/O request queue corresponding to each respective physical domain. Storage system 140 assigns the different I/O queues to different available data paths. And then performs these I/O operations in parallel.

For example, in the embodiment of FIG. 5, when cache system 146 flushes the I/O requests (or more precisely, flushes the data, associated with the I/O requests, from the cache partitions, 502, 504, 506, and 508) to the physical domains (respectively, PD-E, PD-F, PD-G and PD-H), storage system 140 assigns the queues as follows: (i) queue-E 512 receives data associated with R21 and R23 from cache-E 502; (ii) queue-F 514 receives data associated with R22, R25 and R28 from cache-F 504; (iii) queue-G 516 receives data associated with R24 and R26 from cache-G 502; and queue-H 518 receives data associated with R27 from cache-H 508. Storage system 140 then sends the data from the queues (512, 514, 516, and 518) in parallel to the physical domains.

Some embodiments of the present invention may recognize one, or more, of the following facts, potential problems and/or potential areas for improvement with respect to the current state of the art: (i) conventional multipath software does not receive information with respect to real-time I/O pressure on the physical domains in a SAN disk; (ii) conventional multipath software sometimes sends I/O requests by a round-robin technique where I/O requests are dispatched to physical domains in sequential order without regard to the I/O pressure experienced by each physical domain; (iii) adversely affects data path efficiency if: (a) performance of data paths between a host and SAN storage (controlled by multipath software) has a bottleneck, and (b) the multipath software is using the data paths to perform I/O to physical domains that are under high I/O pressure; (iv) scarce data path resources may be used to send I/O requests which cannot be handled right away in the storage system; and (v) if I/O requests reach storage but are not processed immediately, they become hung up in storage, increasing resource consumption (memory usage, processing cycles, etc.) in the storage system.

Some embodiments of the present invention perform the following method to alleviate one or more of the facts or potential problems, or to address areas for improvement listed in the paragraph above: (i) a storage system creates and maintains a configuration diagram; (ii) multipath software 120 resides in the host system; (iii) the storage system supplies storage system interface 148 whereby the real-time pressure for each physical domain in a SAN disk may be queried; (iv) the multipath software accesses the configuration diagram and real-time pressures periodically through the storage system interface; (v) the multipath software invokes the storage system interface to get real-time pressure information from the SAN disk; (vi) multipath software prioritizes and sends I/O requests that are directed to physical domains that are under low I/O pressure; and/or (vii) multipath software delays I/O requests that are directed to physical domains that are under high I/O pressure (a timeout value may be used to limit the delay time).

Further to item (ii) in the paragraph above, multi-path software 120 may reside (may be a module of) in application server 110 (see FIG. 1A), or elsewhere, for example, in storage system 140.

Some embodiments of the present invention may include one, or more, of the following features, characteristics and/or advantages: (i) increases efficiency of data path usage; (ii) directs I/O requests to data paths wherein the I/O requests can be handled immediately; (iii) minimizes I/O requests that become hung in SAN storage; (iv) minimizes tying up of scarce data path resources by I/O requests that cannot be handled immediately; (v) reduces amount of internal storage system resources dedicated to hung I/O requests; (vi) avoids the bandwidth taken by queued I/O requests; (vii) benefits both write and read operations; (viii) benefits all types of SAN disk storage, including types of SAN disk storage where the SAN disk has more than one physical area (for example, any type of redundant array of independent disks (RAID) disk or striped virtual disk; and/or (ix) balances (or tends to balance) the work load among various parts of a SAN disk, in particular, areas of the SAN disk to which a given batch of I/O requests are directed.

When multipath software receives a batch of I/O requests, some embodiments of the present invention select which I/O request should be sent first, second, third, and so on, based on I/O pressure of the target physical domains, to speed up handling of the I/O requests in the storage system. For example, suppose there are five write requests directed to blocks a, b, c, d and e. Further suppose that blocks a and c are heavily pressured (very busy) while b, d and e are not. Embodiments of the present invention first send the requests to blocks b, d and e, then send the requests to blocks a and c.

In some embodiments of the present invention, a host computer system connects to a single storage system. The storage system may include one or more storage controllers. The whole storage system provides one volume (a single storage addressing space, sometimes herein referred to as a "virtual volume") to the host. The volume may be a storage area network (SAN) disk. Embodiments focus on work load balance among different areas of the volume. There may be many data paths between the host computer and the storage system. Each data path can access any area in the volume. The multipath software is made aware (through use of the storage system interface 148) of the workload of each physical area. Based in the workload information, the multipath software can adjust the workload balance of each physical area.

Some embodiments of the present invention extend conventional multipath software by introducing the following features: (i) detecting physical areas of a small computer system interface (SCSI) device from a SAN disk; (ii) acquiring the real-time work load of each physical area in the SAN disk; (iii) for a given batch of I/O requests, determining the physical areas of the SAN disk to which the I/O requests are directed; (iv) determining which I/O request should be sent first, based on the workloads of the physical areas to which the I/Os are directed. In some embodiments of the present invention, if an I/O request is directed to a physical area under low pressure, the request is sent first. If the I/O request is directed to a physical area under high pressure, the request will be sent later.

Alternatively, some embodiments of the present invention operate conversely, that is, if an I/O request in a given batch of I/O requests, is directed to a physical area under high pressure, that I/O request may be sent first. This alternative may be implemented in a scenario where the operating priorities are different, for instance, if the I/O (directed to the very busy physical area) needs to be processed in the shortest possible time. Such an implementation would, rather than optimize I/O path efficiency, seek to minimize latency of a particular I/O request or batch of I/O requests.

FIG. 6 depicts a block diagram of components of computer 600 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

One or more programs may be stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 614. I/O interface(s) 614 also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

What is claimed is:

1. A method comprising:
receiving a physical domains information dataset (PDI dataset) where the PDI dataset includes real-time workload information pertaining to a plurality of physical domains of a storage system, including a first physical domain and a second physical domain, where the first physical domain has a lower workload relative to the second physical domain;
receiving a path workload information dataset (PWI dataset) wherein the PWI dataset includes real-time workload information with respect to a plurality of input/output (I/O) paths directed to the first physical domain, including a first I/O path and a second I/O path, where the first I/O path has a lower workload relative to the second I/O path;
selecting, from an I/O request queue, a first I/O request directed to the first physical domain;
sending the first I/O request to the first physical domain, through the first I/O path;
selecting, from the I/O request queue, a second I/O request directed to the second physical domain;
delaying sending of the second I/O request for a threshold amount of time; and
in response to expiration of the threshold amount of time, sending the second I/O request to the second physical domain.

2. The method of claim 1, further comprising:
receiving an input/output (I/O) request directed to the physical domain;
on condition the I/O request queue exists with respect to the physical domain, adding the I/O request to the I/O request queue;
on condition the I/O request queue does not exist, creating the I/O request queue, and adding the I/O request to the I/O request queue.

3. The method of claim 1 wherein the PDI dataset is a data structure comprising information with respect to the plurality of physical domains, including a first physical domain, of the storage system.

4. The method of claim 3 wherein:
the PDI dataset is a B-tree with a plurality of nodes including a first node where
the first node includes one or more of the following elements: (i) information identifying the first physical domain of the plurality of physical domains, (ii) information resolvable to a starting physical address of an address range of the first physical domain; (iii) information resolvable to an ending physical address of the address range of the first physical domain; (iv) a pointer to a first child node; and (v) a pointer to a parent node.

5. The method of claim 1 wherein the storage system comprises a storage area network.

6. A computer program product comprising:
one or more computer readable storage media and program instructions stored on the one or more computer readable storage media, the program instructions comprising instructions to perform:
receiving a physical domains information dataset (PDI dataset) where the PDI dataset includes real-time workload information pertaining to a plurality of physical domains of a storage system, including a first physical domain and a second physical domain, where the first physical domain has a lower workload relative to the second physical domain;
receiving a path workload information dataset (PWI dataset) wherein the PWI dataset includes real-time workload information with respect to a plurality of input/output (I/O) paths directed to the first physical domain, including a first I/O path and a second I/O path, where the first I/O path has a lower workload relative to the second I/O path;

selecting, from an I/O request queue, a first I/O request directed to the first physical domain;

sending the first I/O request to the first physical domain, through the first I/O path;

selecting, from the I/O request queue, a second I/O request directed to the second physical domain;

delaying sending of the second I/O request for a threshold amount of time; and in response to expiration of the threshold amount of time, sending the second I/O request to the second physical domain.

7. The computer program product of claim 6, further comprising program instructions to perform:

receiving an input/output (I/O) request directed to the physical domain;

on condition the I/O request queue exists with respect to the physical domain, adding the I/O request to the I/O request queue;

on condition the I/O request queue does not exist, creating the I/O request queue, and adding the I/O request to the I/O request queue.

8. The computer program product of claim 6 wherein the PDI dataset is a data structure comprising information with respect to the plurality of physical domains, including a first physical domain, of the storage system.

9. The computer program product of claim 8 wherein:

the PDI dataset is a B-tree with a plurality of nodes including a first node where the first node includes one or more of the following elements: (i) information identifying the first physical domain of the plurality of physical domains, (ii) information resolvable to a starting physical address of an address range of the first physical domain; (iii) information resolvable to an ending physical address of the address range of the first physical domain; (iv) a pointer to a first child node; and (v) a pointer to a parent node.

10. The computer program product of claim 6 wherein the storage system comprises a storage area network.

11. A computer system comprising:

one or more computer processors;

one or more computer-readable storage media;

program instructions stored on the computer-readable storage media for execution by at least one of the one or more processors, the program instructions comprising instructions to perform:

receiving a physical domains information dataset (PDI dataset) where the PDI dataset includes real-time workload information pertaining to a plurality of physical domains of a storage system, including a first physical domain and a second physical domain, where the first physical domain has a lower workload relative to the second physical domain;

receiving a path workload information dataset (PWI dataset) wherein the PWI dataset includes real-time workload information with respect to a plurality of input/output (I/O) paths directed to the first physical domain, including a first I/O path and a second I/O path, where the first I/O path has a lower workload relative to the second I/O path;

selecting, from an I/O request queue, a first I/O request directed to the first physical domain;

sending the first I/O request to the first physical domain, through the first I/O path;

selecting, from the I/O request queue, a second I/O request directed to the second physical domain;

delaying sending of the second I/O request for a threshold amount of time; and in response to expiration of the threshold amount of time, sending the second I/O request to the second physical domain.

12. The computer system of claim 11, further comprising program instructions to perform:

receiving an input/output (I/O) request directed to the physical domain;

on condition the I/O request queue exists with respect to the physical domain, adding the I/O request to the I/O request queue;

on condition the I/O request queue does not exist, creating the I/O request queue, and adding the I/O request to the I/O request queue.

13. The computer system of claim 11 wherein the PDI dataset is a data structure comprising information with respect to the plurality of physical domains, including a first physical domain, of the storage system.

14. The computer system of claim 13 wherein:

the PDI dataset is a B-tree with a plurality of nodes including a first node where the first node includes one or more of the following elements: (i) information identifying the first physical domain of the plurality of physical domains, (ii) information resolvable to a starting physical address of an address range of the first physical domain; (iii) information resolvable to an ending physical address of the address range of the first physical domain; (iv) a pointer to a first child node; and (v) a pointer to a parent node.

15. The computer system of claim 11 wherein the storage system comprises a storage area network.

16. The method of claim 1, further comprising:

wherein determining the workload of the first physical domain is selected from the group consisting of: (i) measuring a duty cycle of the first physical domain over a given time period; (ii) measuring a time-averaged workload backlog of the first physical domain over a given time period; (iii) measuring an instantaneous workload backlog of the first physical domain over a given time period; and (iv) measuring the data volume processed by the first physical domain over a given time period.

17. The computer program product of claim 6, further comprising program instructions to perform:

wherein determining the workload of the first physical domain is selected from the group consisting of: (i) measuring a duty cycle of the first physical domain over a given time period; (ii) measuring a time-averaged workload backlog of the first physical domain over a given time period; (iii) measuring an instantaneous workload backlog of the first physical domain over a given time period; and (iv) measuring the data volume processed by the first physical domain over a given time period.

18. The computer system of claim 11, further comprising program instructions to perform:

wherein determining the workload of the first physical domain is selected from the group consisting of: (i) measuring a duty cycle of the first physical domain over a given time period; (ii) measuring a time-averaged workload backlog of the first physical domain over a given time period; (iii) measuring an instantaneous workload backlog of the first physical domain over a given time period; and (iv) measuring the data volume processed by the first physical domain over a given time period.

\* \* \* \* \*